United States Patent [19]

Wakabayashi et al.

[11] Patent Number: 5,014,751
[45] Date of Patent: May 14, 1991

[54] COMPOSITE HOSE CONSTRUCTION

[75] Inventors: Masashi Wakabayashi; Masuo Kuroda, both of Yokohama, Japan

[73] Assignee: Yokohama Rubber Co., Ltd., Japan

[21] Appl. No.: 426,431

[22] Filed: Oct. 25, 1989

[30] Foreign Application Priority Data

Oct. 28, 1988 [JP] Japan .................. 63-272093

[51] Int. Cl.⁵ .................. F16L 11/02; F16L 11/08
[52] U.S. Cl. .................. 138/127; 138/126; 138/138; 138/149; 138/144
[58] Field of Search ............. 138/127, 126, 124, 123, 138/138, 144, 149, 137, 125, 130, 174, 140, 143

[56] References Cited

U.S. PATENT DOCUMENTS

| | | | |
|---|---|---|---|
| 1,052,106 | 2/1913 | Voorhees | 138/127 |
| 2,730,133 | 1/1956 | Holland-Bowyer et al. | 138/127 |
| 3,791,415 | 2/1974 | Lawless et al. | 138/127 |
| 3,811,477 | 5/1974 | Thawley | 138/137 X |
| 4,154,266 | 5/1979 | Tanaka | 138/137 X |
| 4,249,971 | 2/1981 | Yap et al. | 138/137 X |
| 4,384,595 | 5/1983 | Washkewicz et al. | 138/127 |
| 4,431,031 | 2/1984 | Ettlinger | 138/127 X |
| 4,474,217 | 10/1984 | DeMarse et al. | 138/137 |
| 4,488,577 | 12/1984 | Shilad et al. | 138/127 |
| 4,585,035 | 4/1986 | Pircoli | 138/127 |
| 4,706,712 | 11/1987 | Oglesby et al. | 138/127 X |

FOREIGN PATENT DOCUMENTS

| | | | |
|---|---|---|---|
| 1140376 | 7/1957 | France | 138/127 |
| 17748 | of 1913 | United Kingdom | 138/127 |

Primary Examiner—William A. Cuchlinski, Jr.
Assistant Examiner—Joseph A. Rhoa
Attorney, Agent, or Firm—Finnegan, Henderson, Farabow, Garrett, & Dunner

[57] ABSTRACT

A hose for use in marine loading is disclosed in which are disposed two reinforcing layers, one being formed of a selected fibrous cord and the other of a selected steel cord. The fiber and metal layers are laid in this order over a hose core tube, the layers and the core tube being defined in their total thickness not exceeding half the overall hose thickness. The hose is highly resistant to kinking and sufficiently absorptive to pressure on surging.

3 Claims, 2 Drawing Sheets

5,014,751

COMPOSITE HOSE CONSTRUCTION

BACKGROUND OF THE INVENTION

1. Field of the Invention

This invention relates to a composite hose for use in marine loading.

2. Description of the Prior Art

A typical example of the known hoses of the type described is constructed to have two different reinforcing layers interposed between a core tube and a cover, whereby the hose is rendered resistant to collapse, flexure and distortion caused by external force and pressure. One of the reinforcements results from laminating a synthetic fiber cord over the core and acts as a pressure-resistant layer, and the other is adapted to be a kinking-proof layer formed by spirally winding a wire strand on to the fibrous layer. Another known hose is reinforced in a two-layered structure with steel cords.

The first-mentioned hose of a combination reinforcement is not wholly satisfactory as it is liable to plastically deform upon kinking. The last-mentioned, steel-reinforced hose is restorable even after kinking due to the steel cord being greater in plastic strain than the wire strand. The latter hose, however, is susceptible to interlaminar separation because the steel cord is likely to locally buckle at a position adjacent to the cover as the hose is subject to bending and eventual flattening. The steel-reinforced hose has a further drawback in that it involves objectionable pressure buildup while in surging, leading to insufficient durability. This is attributable to the steel cord being less stretchable in the warpwise and weftwise directions and rather prone to prevent the hose against dilation, hence pressure relaxation.

SUMMARY OF THE INVENTION

With the foregoing difficulties of the prior art in view, the present invention is directed to the provision of a new composite hose which is highly resistant to kinking, restorable even after kinking, relaxable from pressure on surging and free from buckling.

The hose according to the invention contributes to reliable and efficient transportation or otherwise handling of fluids under adverse conditions particularly at sea or on ships.

The above and other objects and advantages of the invention will become better understood from the following description taken in conjunction with the accompanying drawings.

More specifically, the invention is directed to a composite hose comprised essentially of a core tube rubber, first and second reinforcing layers, a filler rubber and a cover rubber superimposed in this order, the first reinforcing layer being formed from a fibrous cord of a synthetic fiber and the second reinforcing layer from a metallic cord of a steel strand. The core tube rubber and the first and second layers are laid up to a thickness equal to or smaller than half the overall hose thickness.

DETAILED DESCRIPTION OF THE INVENTION

Figure 1:
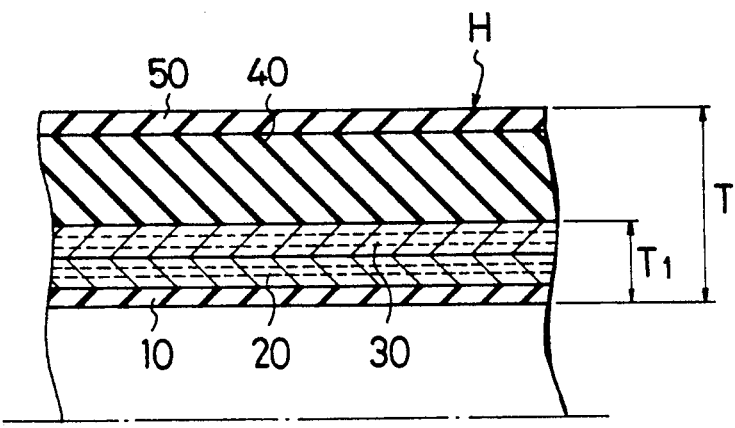
FIG. 1 is a cross-sectional view, cut vertically and seen segmentally, of a hose provided in accordance with the present invention.

Referring now to the drawings and FIG. 1 in particular, there is shown a composite hose H embodying the present invention. The hose H essentially comprises a first reinforcing layer 20 and a second reinforcing layer 30 superposed one on the other over a core tube rubber 10. Designated at 40 and 50 are a filler rubber and a cover rubber, respectively, disposed peripherally over the second layer 30.

The first layer 20 is constituted by a fibrous cord of a selected synthetic fiber and the second layer 30 by a metallic cord of a selected steel strand. Specific examples of synthetic fibers include fibrous filaments of polyesters, nylons, vinylons, rayons and the like. Suitable steel strands are those commonly accepted in the art. The fibrous and metallic cords may conveniently be preformed into a screen-like structure with the use of a rubber coating. Any known rubbers are useful for the layers 10, 40, 50 in their respective thicknesses.

According to one important aspect of the invention, the hose H should be assembled such that the first three layers 10, 20, 30 are defined in their total thickness to be equal to or less than half the overall hose thickness as viewed at $T_1$ and T in FIG. 1. This arrangement ensures enhanced performance of the hose H in a manner to be described.

Figure 5:
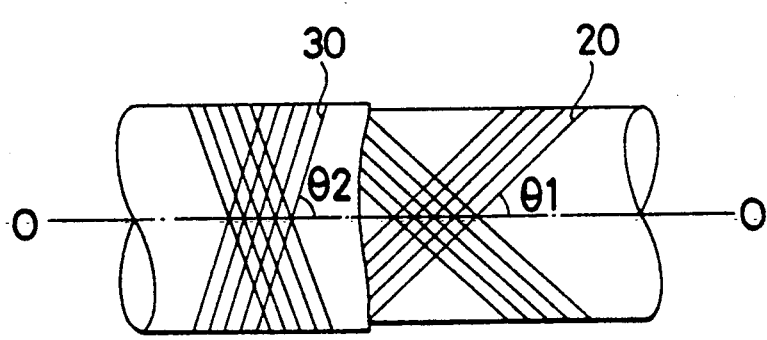
FIG. 5 is a side view, partly broken away in successive structural layers, of a hose made in accordance with the present invention, illustrating the fibrous cord of the first reinforcing layer oriented at an angle within the range of 35 to 55 degrees with respect to the axial direction of the hose and the metallic cord of the second reinforcing layer oriented at an angle in the range of from 70 to 90 degrees with respect to the axial direction of the hose, with the two sets of cords intersecting each other at an angle greater than 35 degrees.

The first layer 20 is laid to absorb internal pressure developed axially of the hose, while the second layer 30 relaxes circumferentially exerted internal pressure. To this end and as shown in FIG. 5 the fibrous cord should preferably be oriented at an angle 201 the range of 35 to 55° and the metallic cord at an angle 202 in the range of 70 to 90°, respectively, with respect to an axial direction of the hose. Also preferably, the two cords should be held in opposed, intersected relation to each other with the difference of angles set above 35°. Each of the first and second layers 20, 30 may be at least of a two-ply formation.

Fibrous cords of wider angles than 55° would make the resulting fiber layer susceptible to axial stress that is requisite to multiple cordage. Departures of fibrous cords from 35° and of metallic cords from 70° would invite reduced resistance to circumferential stress, entailing multiplied cord in the metal layer. In the case of differences of angles not exceeding 35° between the first and second layers, the metal layer would get too rigid and thus interfere the fiber layer in stretching.

The hose according to the invention, provided with a fiber layer of lower modulus coefficient and a metal layer of higher modulus coefficient, is designed to reduce in overall modulus coefficient compared to a hose in which two steel reinforcements are disposed. Assuming that the hose H is exposed to surging, the correlation between the modulus coefficient and the pressure increase is expressed by the equation I.

$$\Delta H = \frac{a}{g} V_0 \quad (I)$$

where
ΔH: pressure increase on surging
a: transmission speed of pressure wave
g: acceleration of gravity
$V_0$: flow speed of fluid
The parameter a above is determinable from the equation II.

$$a = \sqrt{\frac{1}{\frac{r}{g}\left(\frac{1}{K} + \frac{DC}{eE}\right)}} \quad (II)$$

where
r: specific gravity of fluid
K: volume modulus coefficient of fluid
D: inside diameter of hose
C: constant depending on hose-to-coupler connection
e: thickness of hose
E: modulus coefficient of hose On substitution of the equation II for the equation I, ΔH can be seen to reduce with the decrease in E, provided that the magnitude of modulus coefficients alone is varied. This is interpreted to mean that because the whole hose H is small in modulus coefficient, the fiber layer 20 is stretchable enough to increase the hose volume and thus absorb undue pressure on surging.

Figure 2:
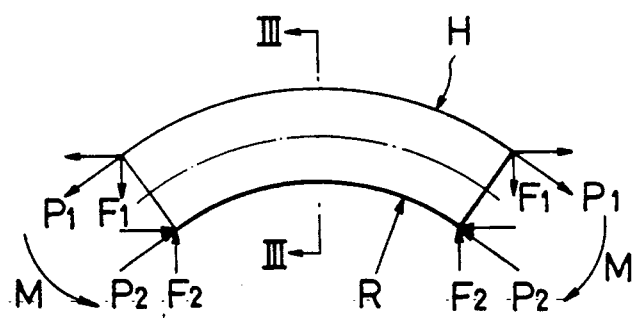
FIG. 2 is a fragmentary schematic view showing the manner in which the hose when flexed is subjected to various forces.
Figure 3:
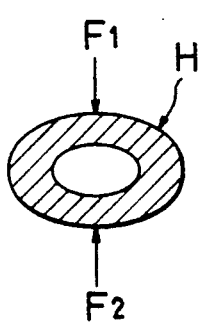
FIG. 3 is a cross-sectional view taken along the line III—III of FIG. 2.

As better shown in FIG. 2, various forces are distributed in the hose H when flexed. Tensile forces $P_1$, $P_2$ become larger in the hose at its external and internal sides as a bending moment M increases in response to a curvature R. The hose in turn deforms under the influence of flattening forces $F_1$, $F_2$ into a cross-sectional oval shape as seen from FIG. 3. Immediately after the hose would have become impossible of bearing against such flattening forces, kinking would take place at either one of the constituent layers and at the fiber layer in particular.

Figure 4:
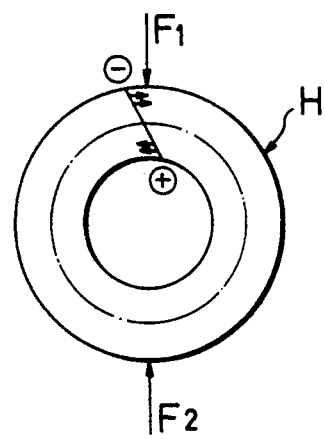
FIG. 4 is a schematic view explanatory of a strain distribution in the hose on flattening.

FIG. 4 is taken to represent the hose H as stressed under the flattening forces $F_1$, $F_2$. In such instance compression strains are generated in the hose at the external side and tensile strains at the internal side, both sorts of strains being concentrated maximum, respectively, in the outermost and innermost circumferences. The hose can be kept, by the action of tensile strains developed by the metal layer, from getting buckled on flexure even at a relatively small curvature.

Various changes and modifications may be made in the above described embodiments as conceived by those skilled in the art within the scope of the appended claims.

What is claimed is:
1. A composite hose comprising:
  a core rubber tube;
  a first reinforcing layer formed of fibrous cord of a synthetic fiber disposed on said core tube;
  a second reinforcing layer formed of stranded steel metallic cord disposed on said first reinforcing layer;
  a filler rubber disposed on said second reinforcing layer;
  a rubber cover disposed on said filler rubber;
  wherein the total thickness of said core tube and said first and second reinforcing layers is not greater than one-half the total thickness of said core tube, said first and second reinforcing layers, said filler rubber and said cover; and wherein said fibrous and metallic cords intersect each other, and said fibrous cord and said metallic cord are oriented at an angle of from 35 to 55 degrees and at an angle of from 70 to 90 degrees, respectively, with respect to the axial direction of said hose, with the difference of such angles being greater than 35 degrees.
2. The hose according to claim 1, wherein said synthetic fiber is formed from one member selected from the group consisting of polyesters, nylons, vinylons and rayons.
3. The hose according to claim 1 wherein said first and second layers each are formed of at least two plies.

* * * * *

UNITED STATES PATENT AND TRADEMARK OFFICE
CERTIFICATE OF CORRECTION

PATENT NO. : 5,014,751

DATED : May 14, 1991

INVENTOR(S) : Masashi Wakabayashi and Masuo Kuroda

It is certified that error appears in the above-identified patent and that said Letters Patent is hereby corrected as shown below:

Column 2, line 47, change "201" to --θ01--.

Column 2, line 48, change "202" to --θ02--.

Signed and Sealed this

Fifth Day of January, 1993

Attest:

DOUGLAS B. COMER

Attesting Officer

Acting Commissioner of Patents and Trademarks